United States Patent
McCallen et al.

(10) Patent No.: US 12,120,526 B2
(45) Date of Patent: Oct. 15, 2024

(54) METHODS AND SYSTEMS FOR DETECTING AND REPORTING NON-APPROVED MOBILE DEVICES IN A SECURE ZONE

(71) Applicant: DRIVING MANAGEMENT SYSTEMS, INC., Colorado Springs, CO (US)

(72) Inventors: Michael J. McCallen, Colorado Springs, CO (US); Michael Tran, Colorado Springs, CO (US); Carl Meurell, Colorado Springs, CO (US); Susan Spradley, Colorado Springs, CO (US); Marwan Hannon, Colorado Springs, CO (US); Gordon Quinn, Colorado Springs, CO (US); Prentice Spradley, Colorado Springs, CO (US); Laura Powell Tucker Johnston, Colorado Springs, CO (US); Robert Mark Azzi, Colorado Springs, CO (US)

(73) Assignee: DRIVING MANAGEMENT SYSTEMS, INC., Colorado Springs, CO (US)

( * ) Notice: Subject to any disclaimer, the term of this patent is extended or adjusted under 35 U.S.C. 154(b) by 231 days.

(21) Appl. No.: 17/432,232

(22) PCT Filed: Feb. 20, 2020

(86) PCT No.: PCT/US2020/019069
§ 371 (c)(1),
(2) Date: Aug. 19, 2021

(87) PCT Pub. No.: WO2020/172429
PCT Pub. Date: Aug. 27, 2020

(65) Prior Publication Data
US 2022/0132319 A1    Apr. 28, 2022

Related U.S. Application Data

(60) Provisional application No. 62/809,278, filed on Feb. 22, 2019.

(51) Int. Cl.
*H04W 4/021* (2018.01)
*H04W 8/22* (2009.01)
*H04W 12/64* (2021.01)

(52) U.S. Cl.
CPC ........... *H04W 12/64* (2021.01); *H04W 4/021* (2013.01); *H04W 8/22* (2013.01)

(58) Field of Classification Search
CPC ..................................................... H04W 4/021
See application file for complete search history.

(56) References Cited

U.S. PATENT DOCUMENTS

| 2011/0021234 A1 | 1/2011 | Tibbitts et al. |
| 2014/0273955 A1* | 9/2014 | Oesterling .............. B60R 25/24 455/411 |

(Continued)

OTHER PUBLICATIONS

International Search Report and Written Opinion for PCT/US2020/019069, dated Jun. 17, 2020.

*Primary Examiner* — Amal S Zenati
(74) *Attorney, Agent, or Firm* — WARNER NORCROSS + JUDD LLP

(57) ABSTRACT

A system to identify a non-approved mobile device includes a scanner for mobile devices. The scanner may be deployed in a vehicle or in a building to detect the location of non-approved mobile devices therein. The scanner may receive RF transmissions from mobile devices located within the range of the scanner. Such mobile devices may be located within, outside, or proximal to the vehicle or building. Based on unique identifying signals, the scanner may classify the devices as approved, non-approved, or transient. The scanner may be in data communication with data (Continued)

storage capacities located within the scanner or accessible through wireless communication. Approved mobile devices may scan for transmissions within their environment and relay information to the scanner.

14 Claims, 6 Drawing Sheets

(56) References Cited

U.S. PATENT DOCUMENTS

2017/0331942 A1   11/2017   Hannon
2018/0069929 A1*   3/2018   Sabbaghian ............ H04L 67/12
2019/0270459 A1*   9/2019   Williams .......... H04M 1/72454

* cited by examiner

METHODS AND SYSTEMS FOR DETECTING AND REPORTING NON-APPROVED MOBILE DEVICES IN A SECURE ZONE

CROSS REFERENCE TO RELATED APPLICATIONS

This application claims priority to U.S. Provisional Application No. 62/809,278, filed Feb. 22, 2019, entitled "METHODS AND SYSTEMS FOR DETECTING AND REPORTING NON-APPROVED MOBILE DEVICES IN A SECURE ZONE," the disclosure of which is hereby incorporated herein by reference in its entirety and for all purposes.

BACKGROUND

Mobile electronic devices with communication capabilities are ubiquitous. Such devices may include, without limitation, cellular telephones (cell phones), tablet computers, laptop computers, notebook computers, and wireless printers. Such devices have the capability to wirelessly connect to other devices and to communications networks such as the Internet. It may be desirable to restrict one or more functions of such devices when they are located in areas or zones deemed secure by stakeholders. Non-limiting examples of such functions may include texting, image recording (still or video), audio recording, accessing social media applications, and viewing streaming videos. In some aspects, secure areas may include the driver's side zone of a vehicle. Stakeholders may include fleet managers who may want to restrict the functions of mobile devices used by drivers of vehicles, especially while the vehicle is moving (for example, restrict texting while driving). In some aspects, stakeholders may include parents who may wish to be assured that their children do not permit their friends or other non-household members to drive a family vehicle. In some other aspects, secure zones may include corporate conference rooms or other locations within a corporate facility. Stakeholders may include corporate management who may want to restrict the functions of mobile devices owned by non-employees who have access to corporate conference rooms or other corporate venues.

In some aspects, communications devices used by fleet vehicle drivers may include software (applications) on a cell phone to prevent the driver from texting while driving. Such applications may be pre-loaded on a corporate-issued cell phone provided to fleet drivers. Alternatively, such applications may be loaded onto a personal cell phone of a driver. Such cell phones may be considered "trusted." In this manner, the driver may be prevented from texting while driving due to the pre-loaded applications on the cell phone. However, it is recognized that such cell phone use restrictions are only effective for cell phones having the pre-loaded software. Non-trusted, or non-approved, cell phones, lacking such safeguards, may still permit drivers to communicate inappropriately while driving. In the aspect related to communications devices used in a corporate facilities, employees may be trusted not to use their communications devices inappropriately based on their terms of employment. However, non-employees who enter corporate facilities may be under no limitations regarding cell phone use.

It is therefore apparent that there is a need to address the presence of non-approved mobile devices in secured areas or zones. The disclosure herein describes systems and methods that may be used to alert stakeholders or their representatives of the presence of non-approved mobile devices so that the stakeholders or their representatives may take appropriate corrective action.

SUMMARY

In one aspect, a scanner for detecting a presence of a non-approved mobile device, may include one or more antennas, configured to receive an RF transmission from a mobile device and a controller comprising a processor in electrical communication with the one or more antennas and in data communication with a processor memory component. The processor memory component may be configured to store instructions that, when executed by the processor causes the processor to receive the RF transmission from the mobile device within a defined environment, obtain, from the RF transmission, unique identifying data specific to the mobile device, and determine an approval status of the mobile device based on the unique identifying data specific to the mobile device.

In one aspect, a system for detecting a presence of a non-approved mobile device, may include a server, having a server memory component configured to store data in a server database, and a scanner. The server database may include an identifier for each of a plurality of identified mobile devices, unique identifying data specific to each of the plurality of identified mobile devices, and an approval status for each of the plurality of identified mobile devices. The scanner may also include a database memory component configured to store data in a local database, one or more antennas configured to receive an RF transmission from a mobile device, and a controller including a processor in electrical communication with the one or more antennas and in data communication with a processor memory component. The local database may include the identifier for each of the plurality of identified mobile devices, unique identifying data specific to each of the plurality of identified mobile devices, and an approval status for each of the plurality of identified mobile devices. The processor memory component may be configured to store instructions that, when executed by the processor causes the processor to receive the RF transmission from the mobile device within a defined environment, obtain, from the RE transmission, unique identifying data specific to the mobile device, and determine an approval status of the mobile device based on the unique identifying data specific to the mobile device. The processor may also be in data communication with the local database and the server database.

FIGURES

DETAILED DESCRIPTION

Figure 1:
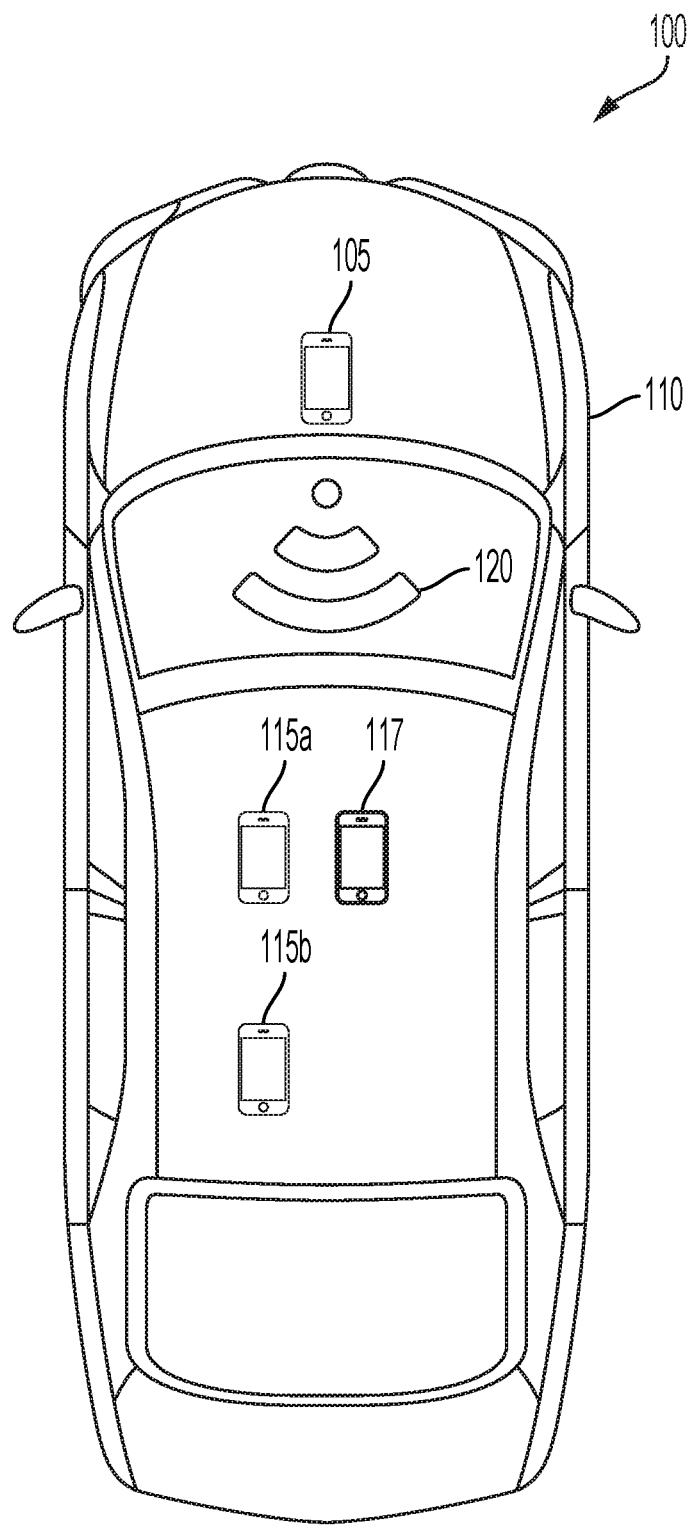
FIG. 1 illustrates the detection of one or more mobile devices within a vehicle in accordance with at least one aspect of the present disclosure.

As disclosed above, circumstances may occur in which restrictions of the use of a mobile device may be desirable. Such circumstances may include the use of mobile devices by drivers of various vehicles or in locations requiring secured information handling. Distinctions may be made between devices regarding whether use of a particular device may be permitted. Such devices may be considered "approved" devices under the particular circumstances. Un-approved devices may be considered to be those in which their use is considered problematic under the circumstances. Enterprise stakeholders may wish to distinguish between the approved devices and the un-approved devices in order to intervene in the use of the un-approved devices.

Mobile devices may take advantage of any of a number of wireless communication protocols, Such protocols may include, without limitation, WiFi, Bluetooth, Low Energy Bluetooth, 3G, 4G, 5G, or LTE. In some aspects, each wireless mobile devices may be identified by a unique media access control (MAC) address. During a communication session, the mobile device may declare its MAC address so that a receiving network may properly identify and route communications packets throughout a network to a recipient and back to the transmitting device. Additional information unique to a communications device may also be declared during a communication session. In some non-limiting aspects, such data may include one or more data related to the make and model of the device, a device serial number, and the present version of the mobile device operating system. As disclosed below, a system and method to identify non-approved mobile devices may be based at least in part on the detection of a MAC address, or other uniquely identifying information, transmitted by a mobile device.

Two possible use cases for the system and method are presented herein. However, it may be recognized by one with ordinary skill in that art that alternative use cases may exist that would also benefit from the detection of unauthorized mobile devices in a secure zone..

Case 1: Non-Approved Mobile Device Detection in a Vehicle

As disclosed above, safety and liability concerns by a fleet operator may suggest that a fleet vehicle driver should be prevented from using certain functions of a mobile device while driving. As a result, the fleet operator may issue an approved mobile device to each driver having applications to prevent or restrict certain mobile device functions—such as texting—while the vehicle is in motion. Alternatively, fleet administrators may require drivers to have such applications loaded onto their personal mobile devices. Fleet operators may wish to discourage drivers from using a non-approved personal device, lacking the restriction application, while driving. Fleet operators may also wish to discourage a fleet driver from permitting additional passengers from entering the vehicle during business use. While the fleet operator may have control over the approved devices, products to deliberately jam mobile devices (either approved or non-approved) are forbidden. Therefore, the fleet operator must be notified of the presence of such non-approved devices in order to take alternative actions.

FIG. 1 illustrates an aspect 100 of the use of a scanner 105 in a vehicle 110. Although the vehicle 110 depicted in FIG. 1 appears to be a passenger car, it is understood that the vehicle 110 may be any sort of vehicle including, without limitation, a car, a light truck, a panel truck, a semi-tractor trailer, a train, a plane, a jet, a helicopter, or other vehicle. In some aspects, a vehicle 110 may be equipped with a detector or scanning device 105 configured to detect transmissions from one or more mobile devices 115a, 115b, 117. Although three such mobile devices are depicted in FIG. 1, it may be recognized that any number or type of mobile devices may be found in a vehicle. Non-limiting examples of mobile devices may include cell phones, smart phone, tablets, or laptop computers. Such a detector or scanner 105 may be incorporated within the vehicle 110 or detector or scanner 105 may be included in an after-market vehicle head unit device. In some aspects, such detectors or scanners 105 may be configured to scan over a wide range of communication frequencies in order to detect transmission based on any communication protocol. Non-limiting examples of such communication frequencies may include Bluetooth frequencies, cellular frequencies (for example in the 600 MHz through 3.8 GHz range), WiFi bands including, without limitation, 3G, 4G, 5G, Bluetooth WiFi bands, or any other consumer accessible communication frequencies. Such detectors or scanners 105 may be capable of detecting a mobile device transmission and determine uniquely identifying data associated with the mobile device 115a, 115b, 117. In some aspects, the uniquely identifying data may include one or more of a MAC address, data related to the make and model of the device, a device serial number, and the present version of the mobile device operating system. In some additional aspects, different information may be obtained by scanning technologies such as BT and WiFi which can provide MAC address as well as signal strength (RSSI) and vendor of a mobile device. Timestamps are to be recorded along with the data. Cellular technology like LTE and 5G can be utilized to identify unique devices using uniquely identifiable RF signatures from each device. Such a system may be able to detect a transmission from any mobile device, either an approved mobile device 115a, 115b or a non-approved mobile device 117.

The detector or scanner 105 may further include required computational elements, including, without limitation, one or more processors, one or more memory devices, and one or more data storage devices. The memory devices may include instructions that, when executed by the one or more processors, may cause the one or more processors to receive data associated with a communication transmission 120 (via an antenna, for example) and parse the communication transmission 120 for any one or more uniquely identifying data elements characteristic of the transmitting device (such as a MAC address).

Figure 2:
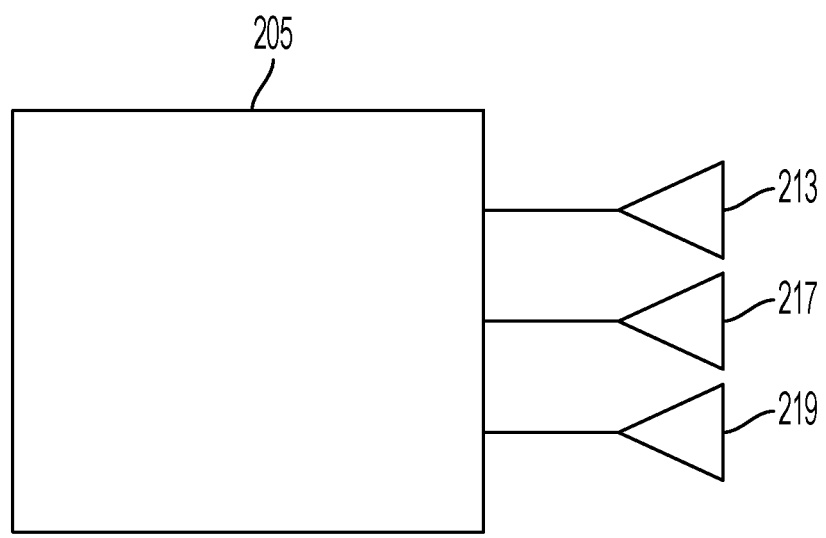
FIG. 2 illustrates a scanning device configured to scan for one or more mobile devices in accordance with at least one aspect of the present disclosure.

FIG. 2 illustrates an example of a detector or scanner 205. The detector or scanner 205 may have the ability to monitor any number of mobile device transmission including, without limitation, Bluetooth transmissions on one antenna 213, WiFi transmissions on a second antenna 217, and 5G transmissions on a third antenna 219. It may be recognized that additional antennas may be included to monitor transmissions at other frequencies such as for example 4G or 4G/LTE transmissions. In some aspects, multiple transmissions may be monitored by a single antenna. The detector or scanner 205 may be configured to scan the environment for mobile device transmission on a continuous basis. Alternatively, the detector or scanner 205 may be configured to scan the environment for mobile device transmission on an intermittent basis. An intermittent scan may be used to detect the presence of transient mobile devices. According to one aspect, transient mobile devices may be those that are located within the vehicle and are transiently powered on and then off. In another aspect, transient mobile devices may be those that are located outside the vehicle and which may move towards—in scanner range—and then away—outside of scanner range—from the vehicle (for example, mobile phones used by pedestrians who walk past the vehicle while parked).

Figure 3:
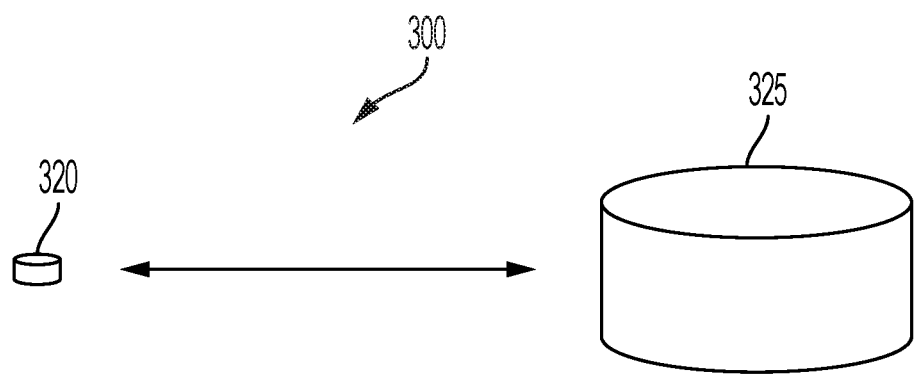
FIG. 3 illustrates a relationship between a local data repository and a central, cloud-based data repository in accordance with at least one aspect of the present disclosure.

The computational elements in the scanner may then store the identification information locally in a data storage device and/or transmit such data to a receiving server accessible over the internet (a cloud server), as depicted in FIG. 3. Thus, some data-storage capacity 300 may include local data storage capacity 320 located in the scanner. Additional data-storage capacity may be located in a server storage facility 325 or other remote storage facility. For example, if there is an interruption in wireless communication between the detector and the server storage facility 325, the local data storage facility 320 may store the present information locally until wireless communications have been restored. Upon the restoration of internet communication, the local data storage facility 320 may synchronize its data with the server storage facility 325. Both the local data storage facility 320 and the server storage facility 325 may have databases in which the data obtained from the scanned mobile devices may be stored. In some aspects, every registered device may exist as a record in the database. In non-limiting examples, database records may contain IDs, MACs, RF signature, and timestamps associated with registered devices. Unregistered devices that are persistent (non-transitory) may also be recorded in the database of the local data storage facility 320 and a notification may be sent to the server storage facility 325 for any actions to be taken. The server storage facility 325 may store previously approved device information including, without limitation, date approved, how/who approved, type of device, timestamps, MAC, and RF signature. When a device is approved, its registration information may be sent to the local data storage facility 320 in the vehicle. Unregistered device notifications require that one or more actions may be taken. In some examples, the actions may include approving the device, storing the unapproved information (timestamp of detection, duration present, etc.) the server storage facility 325, notifying a supervisor and similar.

Returning to FIG. 1, in some aspects, the scanner 105 may store a list or partial list of identifying data elements that have been identified as belonging to an approved mobile device 115a,b (such as a fleet operation issued cell phone) as depicted in FIG. 1. Communications from the detector or scanner 105 to the cloud server may include an indicator that the identifying data elements have been detected and are tagged as belonging to an approved device. In some further aspects, additional data associated with the mobile devices 115a,b, 117 may include location data (derived from the mobile device GPS system) or time-stamps associated with the transmission 120 of the mobile devices 115a,b, 117.

It may be recognized that a system based on a detector and characterizes of mobile devices may have utility in a number of circumstances in which a distinction between approved and non-approved mobile devices is required. It should be noted that the system described herein is directed only toward the identification of a physical mobile device itself. The applications and analyses of device data are not intended to extract personal information from a mobile device. Thus, text messages, stored images, internet page cache data, voice data, stored passwords, and the content of any mobile device telecommunication—outside of data specifically related to the physical mobile device itself—are not available to the system disclosed herein.

To determine if the approved or non-approved device is associated with the driver of the vehicle 110, the detector or scanner 105 may also determine the relative signal strength (RSSI) of the transmission. Because the relative signal strength received by a detector is related to the distance between the transmitter and receiver, the detector 105 may be able to determine the location of the mobile device relative to the driver's seat. In some aspects, multiple detectors or scanners 105 may be placed in different parts of the vehicle. In this manner, the multiple detectors or scanners 105 may be able to triangulate the position of the transmitting mobile device, thereby permitting improved localization capabilities. In some aspects, the measured relative signal strength may be an indication that the mobile device is in a front seat of a vehicle, a back seat of a vehicle, a vehicle trunk, or a vehicle sleeping cab (for a semi-trailer truck). Un-approved mobile devices 117 located in the front seat of a vehicle may pose a safety risk if appropriate applications to limit mobile device use are not loaded onto such mobile devices. However, mobile devices located in the back seat, the trunk, or sleeping cab may not pose such risks.

In another aspect, the approved mobile device may additionally include applications (detector applications) allowing the approved device to scan the local environment and identify other local mobile devices. It may be understood that a local environment may be defined in terms of an area defined by a distance from either one or more scanners incorporated in or added to the vehicle, or an approved mobile device acting as a scanner. In some aspects, a local environment may include a driver's seat area. In some aspects, a local environment may be about the length of a passenger car. For example, a local environment may extend about 5-6 ft. (about 1.5-1.8 m) from the detector or scanner. In another aspect, the local environment may be about the length of a light truck. In another aspect, the local environment may be about the length of a semi-tractor trailer. In another aspect, the local environment may be about the length of a railway car. In some examples, the extent of the local environment may be an adjustable parameter that may be programmed into the detector or scanner.

Figure 4:
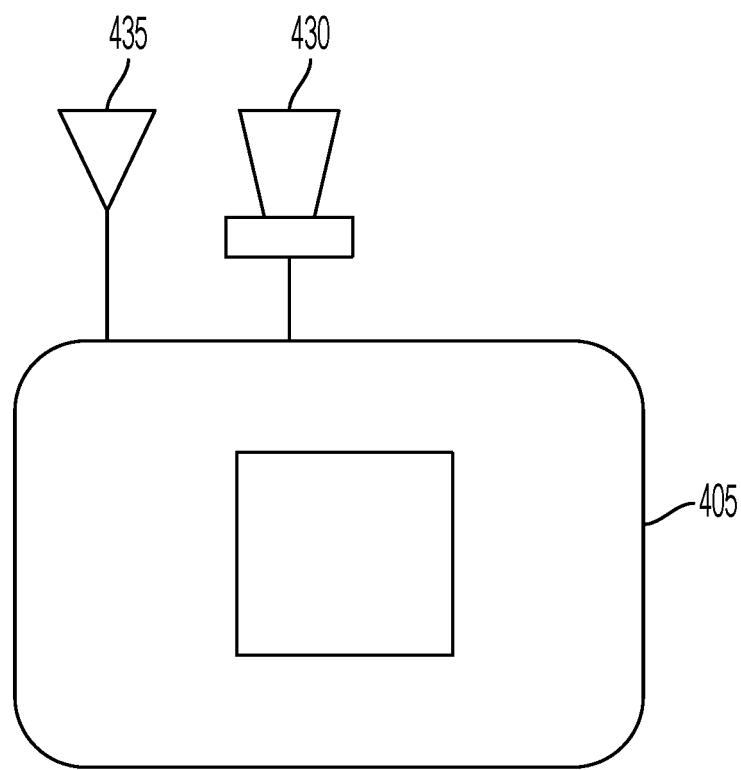
FIG. 4 illustrates a mobile device incorporating scanning functions in accordance with at least one aspect of the present disclosure.

FIG. 4 depicts the use of an approved mobile device 405 have one or more detector antenna 435 as well as a transmitter antenna 430. The detector application in the approved device 405 may function similarly to the vehicle detector and determine the uniquely identifying data of the other mobile devices through the one or more scanner antennas 435. The approved mobile device 405 may then transmit this additional data to the vehicle via the transmitter antenna 430, as a redundant method for identifying non-approved devices. The vehicle detector may relay the transmission received from the approved mobile device through the internet, and to the server storage facility.

In yet another aspect, the detector applications on the approved mobile device 405 may include a function to directly address the vehicle detector when the approved mobile device 405 is powered. The direct address function may provide the vehicle detector with a unique device signature, thereby identifying the approved mobile device 405 to the vehicle-based detector. The beacon signal may include data to identify the approved mobile to the vehicle detector. The vehicle detector may use the beacon signal as a means to determine that the mobile device issuing it is an approved device.

Figure 5:
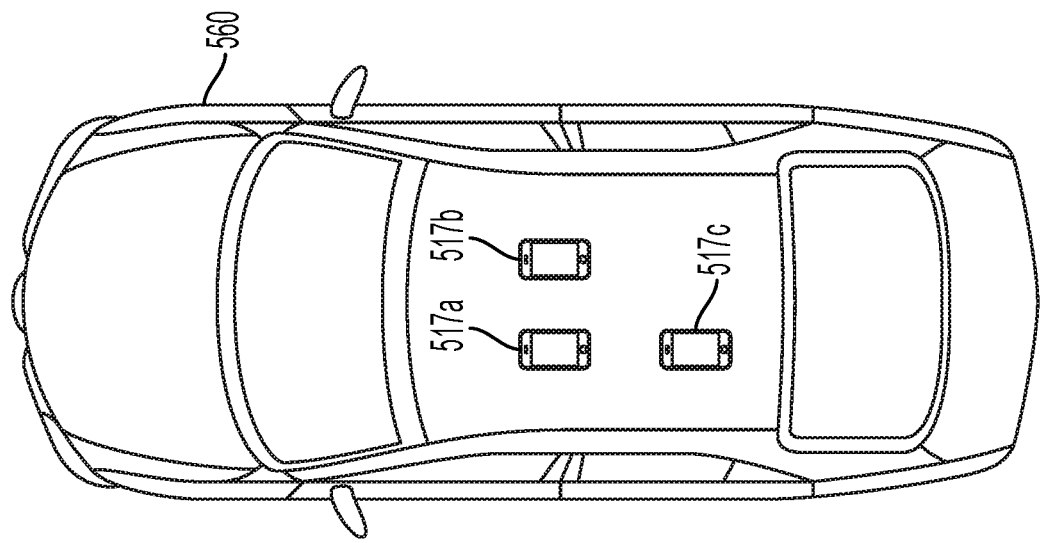
FIG. 5 illustrates the detection of one or more mobile devices distributed between two vehicles in accordance with at least one aspect of the present disclosure.
Figure 5:
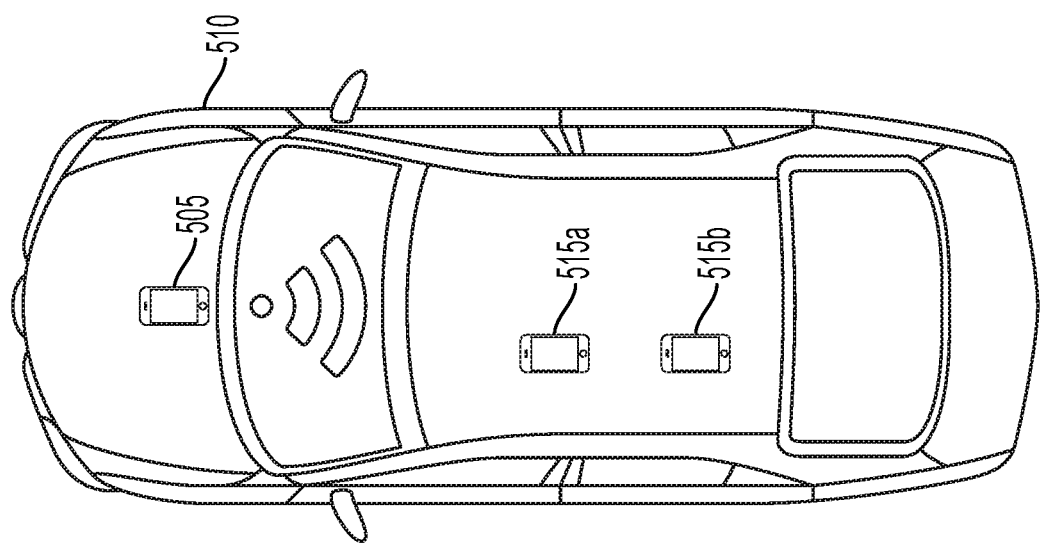

It may be understood that a vehicle detector or an approved mobile device-based detector may come within a communications distance of additional mobile devices besides those that may be located within the fleet vehicle. FIG. 5 depicts such an example. Depending on the detection distance set for the sensor or scanner 505 in the fleet vehicle 510, mobile devices outside of the fleet vehicle may also be detected in addition to those mobile devices 515a,b located within the fleet vehicle 510. For example, a scanner detection distance of about 5 feet to about 10 feet may detect mobile devices carried by pedestrians walking next to the fleet vehicle, or mobile devices located in vehicles parked next to or passing by the fleet vehicle For example, the fleet vehicle 510 may be parked or stopped next to a second vehicle 560 in which the driver and/or passengers are using mobile devices 517a,b,c. Alternatively, the fleet vehicle 510 may be stopped and pedestrians may walk by while using their mobile devices. The driver of the fleet vehicle 510 may drive past a pick-up window (for example of a fast food store) to pick up a meal while driving the fleet vehicle 510. In each of these examples, the scanner or sensor 505 may detect the mobile devices of people within the environment outside of the vehicle. Such mobile devices (such as 517a,b,c) may be termed "transient" as their presence near the detector may have a limited time duration. Each of these mobile devices 517a,b,c may be detected by the detector 505 and their uniquely identifying information may be stored in memory. However, the detector 505 may also record the RSSI of the transient mobile devices 517a,b,c, and provide this information to the cloud server as well. It may be recognized that transient mobile devices 517a,b,c may be so characterized based on their RSSI (the signal strength is lower than a threshold associated with a distance from the detector to the vehicle interior). In some aspects, the characterization of a transient mobile device may be configurable. Thus, an RSSI threshold for characterizing a transient device may be adjusted. Alternatively, the amount of time in which the transient device is detected can also be adjusted. For example, if the sensor or scanner scans the environment for approved/unapproved devices every 30 seconds, a transient device may be defined as one detected during a first scan and not detected in the subsequent scan. The scan rate may be configurable, for example with 30 second periods, 1 minute periods, 2 minute periods, and similar.

In some aspects, the vehicle detector or the approved mobile device (as a detector) may scan the environment for mobile devices when the detectors are initially powered (for example, if the vehicle detector is part of the vehicle head unit or for the approved mobile device). In some instances, the vehicle detector may scan the environment while the vehicle is in motion (if the detector is an add-on unit to the vehicle). Motion may be detected, for example from a vehicle or detector accelerometer. Such environment scanning may be called "active" scanning. Alternatively, the vehicle detector or the approved mobile device (as a detector) may scan the environment for mobile devices on a periodic basis (for examples, every minute, every two minutes, every five minutes, every ten minutes, or based on other timing parameters). Such environmental scanning may be described as "passive" scanning.

In some aspects, the uniquely identifying data may be composed of a unique signature composed of data associated with a specific mobile device. In some aspects, the unique signature may include a mobile device's MAC address. In alternative aspects, the unique signature data may reflect slight variations in RF signal transmission characteristics based on the natural variability of the electronic components—for example resistors, capacitors, oscillators, diodes, as non-limiting examples—that result in minor shifts in the RF signal transmission. Unique signature data may be used to verify that a MAC address, for example, is not being spoofed by another mobile device, or to identify a device using a transmission protocol that does not include the MAC address or the MAC address is encrypted, In one aspect, a database resident either in the local data repository or in the cloud-based data repository (or both) may include entries that relate a registered mobile device with one or more unique signature data, such as a MAC address.

In one aspect, once the vehicle detector has received the identifying information from all mobile devices detected, the data may be compared with a local data store in the detector to characterize an approval status of the mobile devices. Non-limiting examples of the approval status may be approved, approved within the driver's zone, non-approved, non-approved within the driver zone, or transient (outside of the vehicle). The vehicle detector may then transmit this information, along with other data (such as a vehicle identifier, a time and date stamp, a vehicle location via GPS, and similar) to a cloud server.

The cloud server may receive the data from the vehicle detector and additionally filter and store the information. The data may be filtered based on client requirements or intelligent data analytics. Such information may be incorporated in a database for future reference. In some aspects, the server may update the data of the database with the newly received data. The database may reside in a data repository which may be part of the same server or may be part of a specific data server or servers. For example, information from transient devices may be stored including the uniquely identifying information and signal strength to verify the transient nature of the mobile device. The server may also determine if the transient device was encountered only one time or repeatedly, based on the stored data in the database. In some aspects, data related to transient devices may have a limited retention period. Thus, after some period of time, if a specific transient device is not detected a second time, the original data may be purged. The retention time may be determined by a client or stakeholder interested in the operation of the vehicle. Similarly, non-approved devices may be recognized, and the server may use the database to determine if the same non-approved device is detected more than once.

The cloud server may also receive data from third party databases. Third parties may include fleet owners, fleet integrators, insurance providers, and similar. One example of such databased may include an enterprise database. In some aspects, the enterprise database may contain data solely available to the enterprise client. In some alternative aspects, some of the data in the enterprise database may be available. The enterprise database may include lists of mobile device identifiers which have been previously cleared and are considered approved. For example, a vehicle may have a wireless printer installed, which does not include any additional applications installed. In one example, the wireless printer MAC address may be included in the enterprise database in a "white list" of approved devices. In another example, a MAC address of wireless diagnostic equipment used by a repair technician may be added to the "white list."

Another example of a third party database may include a database provided by individual consumers (from a third party subscription service). The individual consumer database may include additional identifiers associated with non-approved mobile devices of minors who are not permitted to drive.

The cloud server may use all of the data from the various databases—the server-based database and third party database—to characterize the types of mobile devices detected by the vehicle detector (or approved mobile device acting as a detector). The cloud server may then use appropriate rules and filters based on the databases to characterize the detected mobile devices (approved/non-approved/transient/white-listed) along with their positions relative to the vehicle and driver zone, and their times of detection. The data may be incorporated into a report transmitted to a receiving device for use by a stakeholder (such as a fleet manager), a stakeholder representative (a corporate security officer), or other third party. In some aspects, the receiving devices may include a mobile devices, laptop devices, or desktop devices. In some aspects, the report may include a text report or a graphical report. One non-limiting example of a graphical report may include a computer display dashboard schematically depicting the interior of the vehicle. The dashboard display may display representative images or icons indicating the relative location of the mobile devices—in the driver's zone, the passenger zone, or exterior—and the nature of the mobile device (approved, non-approved, transient, or white-listed). In one example, the displays may color code the icons representing the mobile device according to their characteristics. The graphical display may also present identification information for each mobile device, such as MAC address or identifying text stored in the database.

The stakeholders of the vehicle fleet organization may then use the data according to established rules and procedures regarding employees. For example, if a non-approved device routinely appears in a vehicle driven by a specific driver, the fleet manager may communicate with the driver about the non-approved device to determine if the driver is operating outside of established fleet rules and directives (for example, giving rides to non-fleet employees). The fleet manager may note that certain transient devices are routinely detected when a particular driver is driving the vehicle. For example, the driver may routinely stop by a fast food store to pick up lunch at a particular time, and the system may detect the cell phone of the employee handing out the food. The detection and recording system may be particularly useful in tracking a vehicle if it is stolen (based on the cell phone of the perpetrators).

Case 2: Non-Approved Mobile Device Detection in a Corporate Venue

Security concerns of stakeholders in a corporation or other business may wish to maintain secrecy regarding products, marketing strategies, intellectual property, and potential product development. In some cases, non-employees may visit a corporate building or campus on legitimate business. However, the stakeholders may want to restrict the visitors' ability to see or hear matters that the stakeholders would prefer to keep secure. Thus, visitors may be escorted and limited in their movements about the corporate venue However, in some instances, the visitors may stray from their assigned locations and may wander into portions of the corporate venue in which their access should be denied. Alternatively, visitors may be invited to attend presentations but under directions that the material not be recorded or transmitted outside of the venue. In these instances, it may be appropriate to determine if a visitor, having an un-approved mobile device, is transmitting information outside of the venue.

Figure 6:
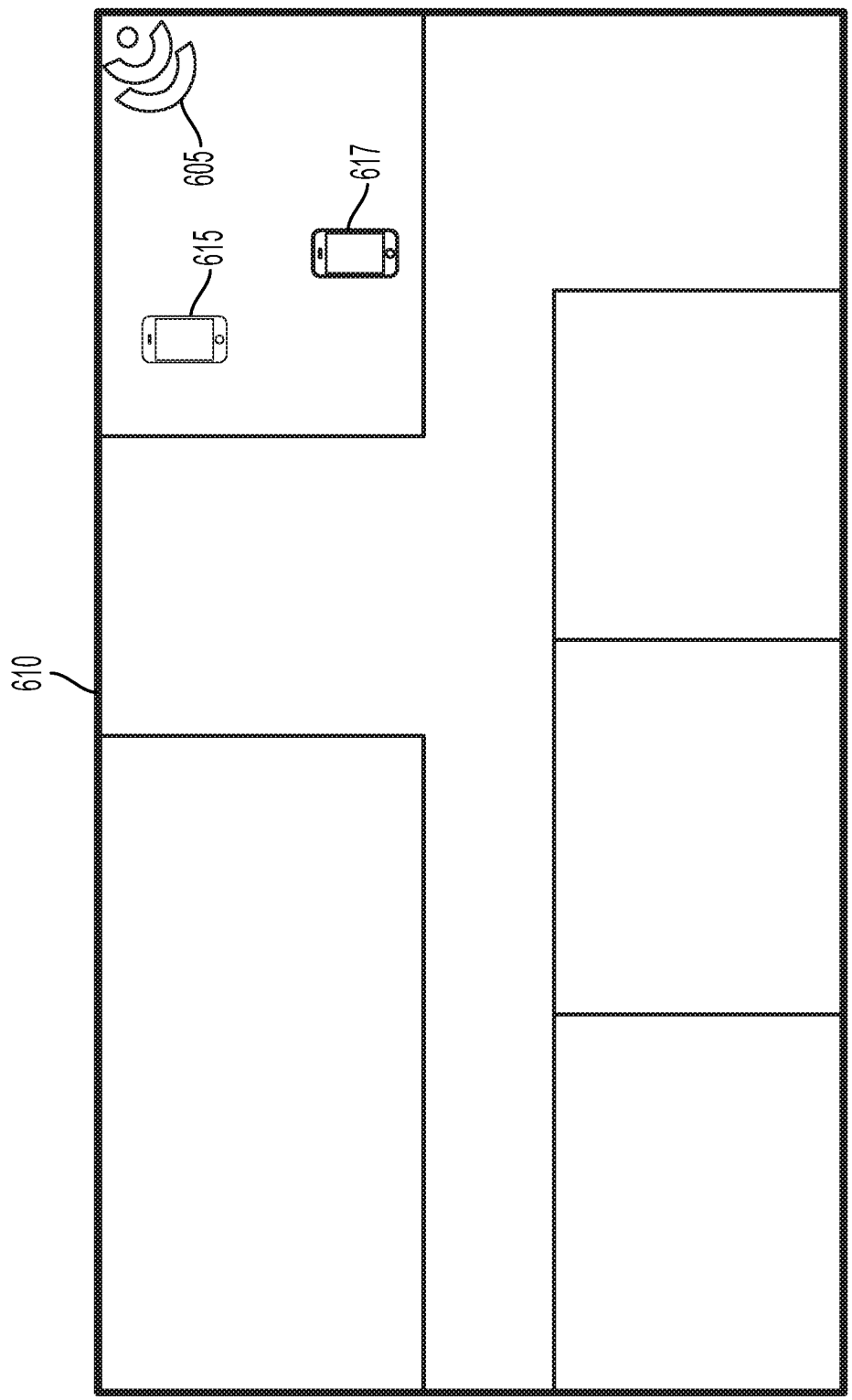
FIG. 6 illustrates the detection of one or more mobile devices within an office space in accordance with at least one aspect of the present disclosure.

One or more mobile phone detection systems, as disclosed above, may be used in various rooms to detect the presence of un-approved devices, as depicted in FIG. 6. For example, in a company building or facility 610, one or more rooms may be equipped with a mobile device detector or scanner 605. Such rooms may include, without limitation, conference rooms, laboratories, and test facilities. In some aspects, a room-based mobile device detector 605 may be a dedicated device. In other aspects, a router or RF hot-spot may include additional applications to permit it to act as a mobile device detector (having functions as disclosed above).

Employees of the company may all have mobile devices 615 approved by the management. In some cases, the approved mobile devices 615 may be personal devices having detector applications similar to those disclosed above loaded on the devices. Such applications, for example, may restrict one or more operations of the approved mobile device 615 including, without limitation, photographic capture functions, video capture functions, texting, internet access, or other functions. Thus, the approved mobile devices 615 may have applications to cause the approved devices to self-identify to a room-based detector 605 when the approved mobile device 615 is powered. The approved mobile devices 615 may have applications to cause the approved mobile device 615 to detect non-approved mobile devices 617 within their environment, and transmit the non-approved mobile device 617 information (including uniquely identifying information) to a room-based detector 605. The approved mobile devices 615 may be personal devices having the application installed thereon, or the approved mobile devices 615 may be supplied by the company. In alternative aspects, the approved mobile device 615 may lack any additional applications, but may have their MAC addresses provided to a "white-list" of pre-approved devices as disclosed above.

The room-based detector 605 may operate essentially the same as the vehicle detector disclosed above. Thus, the room-based detector 605 may receive a self-identifying signal from an approved device. The room-based detector 605 may determine a MAC address of any mobile device within range based on the transmissions of the mobile device. The room-based detector 605 may determine a location of a mobile device based on the signal strength of a wireless transmission. The room-based detector 605 may obtain additional characterization information (unique signature) of a mobile device. In some aspects, the room-based detector 605 may detect mobile devices carried by people outside of the secured room or outside of the building. Such devices may also be characterized as transient devices based on criteria similar to those disclosed above with respect to vehicle based detection. Thus, transient devices may be defined by their limited appearance during multiple or successive device scans, or defined by their as signal strength (RSSI). It may be understood that the range of the room-based detector 605 may be configurable. Thus, the room-based detector 605 may have a range of about 20 feet for an office, 60 feet for a medium sized conference room, or other range as may be required based on the room size.

As disclosed above, the room-detector 605 may obtain the mobile device identification data and compare it with a local database to determine if a mobile device is approved (such as 615) or not approved (such as 617). The room-detector 605 may transmit the mobile device data over a wired or wireless communication to a server. In some aspects, the server may be physically located at the company premises and the connection with the room-detector and the server may be over a wired communication protocol (such as Ethernet), In another aspect, the server may be a cloud-based server and the room-detector may connect with the server over a wireless protocol.

As disclosed above, the server may receive the room-detector data and compare it to a database of approved or non-approved devices. The server may update the data of the database with the newly received data. The server may obtain additional data from third party databases. For example, a third party database may include a white-list of known and approved communication devices such as wireless printers, wireless keyboards, wireless pointing devices, or other office equipment having wireless communications capabilities.

The cloud server may use all of the data from the various databases—the server-based database and third party database—to characterize the types of mobile devices detected by the room detector (or approved mobile device acting as a detector). The cloud server may then use appropriate rules and filters based on the databases to characterize the detected mobile devices (approved/non-approved/transient/white-listed) along with their positions relative to the room, and time of detection. The data may be incorporated into a report transmitted to a receiving device for use by a stakeholder (such as a corporate manager), a stakeholder representative (a corporate security officer), or other third party. In some aspects, the receiving devices may include a mobile devices, laptop devices, or desktop devices. In some aspects, the report may include a text report or a graphical report. One non-limiting example of a graphical report may include a computer display dashboard schematically depicting the interior of the room. The dashboard display may display representative images or icons indicating the relative location of the mobile devices within the room and the nature of the mobile device (approved, non-approved, transient, or white-listed). In one example, the displays may color code the icons representing the mobile device according to their characteristics. The graphical display may also present identification information for each mobile device, such as MAC address or identifying text stored in the database.

The stakeholders of the company may then use the data according to established rules and procedures regarding employees and/or visitors. In one non-limiting example, the presence of a non-approved device in a particular location within a company venue may be noted by company security, managers, IT personnel, or other stake-holder representatives. In some aspects, a representative of company security may be dispatched to the location of the non-approved mobile device to make additional inquiries. In some aspects, the detection of a non-approved mobile device by a room-based scanner may result in the room-based scanner triggering one or more alarms such as an audible alarm or a visual alarm that is noted by a stake-holder or stake-holder representative. In some aspects, the alarm may be provided as a text message to the stake-holder or stake-holder representative.

While several forms have been illustrated and described, it is not the intention of the applicant to restrict or limit the scope of the appended claims to such detail. Numerous modifications, variations, changes, substitutions, combinations, and equivalents to those forms may be implemented and will occur to those skilled in the art without departing from the scope of the present disclosure. Moreover, the structure of each element associated with the described forms can be alternatively described as a means for providing the function performed by the element. Also, where materials are disclosed for certain components, other materials may be used. It is therefore to be understood that the foregoing description and the appended claims are intended to cover all such modifications, combinations, and variations as falling within the scope of the disclosed forms. The appended claims are intended to cover all such modifications, variations, changes, substitutions, modifications, and equivalents.

Instructions used to program logic to perform various disclosed aspects can be stored within a memory in the system, such as dynamic random access memory (DRAM), cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, compact disc, read-only memory (CD-ROMs), and magneto-optical disks, read-only memory (ROMs), random access memory (RAM), erasable programmable read-only memory (EPROM), electrically erasable programmable read-only memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the nontransitory computer-readable medium includes any type of tangible machine-readable medium suitable for storing or transmitting electronic instructions or information in a form readable by a machine (e.g., a computer).

As used in any aspect herein, the term "control circuit" or "controller" may refer to, for example, hardwired circuitry, programmable circuitry (e.g., a computer processor comprising one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

As used in any aspect herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

As used in any aspect herein, the terms "component," "system," "module" and the like can refer to a computer-related entity, either hardware, a combination of hardware and software, software, or software in execution.

As used in any aspect herein, an "algorithm" refers to a self-consistent sequence of steps leading to a desired result, where a "step" refers to a manipulation of physical quantities and/or logic states which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities and/or states.

A network may include a packet switched network. The communication devices may be capable of communicating with each other using a selected packet switched network communications protocol. One example communications protocol may include an Ethernet communications protocol which may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in December, 2008 and/or later versions of this standard. Alternatively or additionally, the communication devices may be capable of communicating with each other using an X.25 communications protocol. The X.25 communications protocol may comply or be compatible with a standard promulgated by the International Telecommunication Union-Telecommunication Standardization Sector (ITU-T). Alternatively or additionally, the communication devices may be capable of communicating with each other using a frame relay communications protocol. The frame relay communications protocol may comply or be compatible with a standard promulgated by Consultative Committee for International Telegraph and Telephone (CCITT) and/or the American National Standards Institute (ANSI). Alternatively or additionally, the transceivers may be capable of communicating with each other using an Asynchronous Transfer Mode (ATM) communications protocol. The ATM communications protocol may comply or be compatible with an ATM standard published by the ATM Forum titled "ATMMPLS Network Interworking 2.0" published August 2001, and/or later versions of this standard. Of course, different and/or after-developed connection-oriented network communication protocols are equally contemplated herein.

Unless specifically stated otherwise as apparent from the foregoing disclosure, it is appreciated that, throughout the foregoing disclosure, discussions using terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

One or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Those skilled in the art will recognize that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flow diagrams are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise, Furthermore, terms like "responsive to," "related to," or other past-tense adjectives are generally not intended to exclude such variants, unless context dictates otherwise.

It is worthy to note that any reference to "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in an exemplification," and "in one exemplification" in various places throughout the specification are not necessarily all referring to the same aspect. Furthermore, the particular features, structures or characteristics may be combined in any suitable manner in one or more aspects.

Any patent application, patent, non-patent publication, or other disclosure material referred to in this specification and/or listed in any Application Data Sheet is incorporated by reference herein, to the extent that the incorporated materials is not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more forms has been presented for purposes of illustration and description. It is not intended to be exhaustive or limiting to the precise form disclosed. Modifications or variations are possible in light of the above teachings. The one or more forms were chosen and described in order to illustrate principles and practical application to thereby enable one of ordinary skill in the art to utilize the various forms and with various modifications as are suited to the particular use contemplated. It is intended that the claims submitted herewith define the overall scope.

Various aspects of the subject matter described herein are set out in the following numbered examples:

Example 1

A scanner for detecting a presence of a non-approved mobile device, the scanner comprising:
- one or more antennas, wherein the one or more antennas are configured to receive an RF transmission from a mobile device; and
- a controller comprising a processor in electrical communication with the one or more antennas and in data communication with a processor memory component, wherein the processor memory component is configured to store instructions that, when executed by the processor causes the processor to:
  - receive the RF transmission from the mobile device within a defined environment;
  - obtain, from the RF transmission, unique identifying data specific to the mobile device; and
  - determine an approval status of the mobile device based on the unique identifying data specific to the mobile device.

Example 2

The scanner of Example 1, further comprising a database memory component configured to store data in a local database, wherein the local database comprises an identifier for each of a plurality of identified mobile devices, unique identifying data specific to each of the plurality of identified mobile devices, and an approval status for each of the plurality of identified mobile devices.

Example 3

The scanner of example 2, wherein the processor memory component is configured to store instructions that, when executed by the processor causes the processor to determine an approval status of the mobile device based on a comparison of the unique identifying data specific to the mobile device and the unique identifying data of an identified mobile device stored in the local database.

Example 4

The scanner of any one or more of Examples 1 through 3, wherein the controller is in wireless data communication with a server having a server memory component configured to store data in a server database, wherein the server database comprises an identifier for each of a plurality of identified mobile devices, unique identifying data specific to each of the plurality of identified mobile devices, and an approval status for each of the plurality of identified mobile devices.

Example 5

The scanner of Example 4, wherein the processor memory component is configured to store instructions that, when executed by the processor causes the processor to determine an approval status of the mobile device based on a comparison of the unique identifying data specific to the mobile device and the unique identifying data of an identified mobile device stored in the server database.

Example 6

The scanner of Example 4, further comprising a database memory component configured to store data in a local database wherein the processor memory component is configured to store instructions that, when executed by the processor, causes the processor to update the local database with data stored in the server database.

Example 7

The scanner of Example 4, further comprising a database memory component configured to store data in a local database wherein the processor memory component is configured to store instructions that, when executed by the processor, causes the processor to update the server database with the data stored in the local database.

Example 8

The scanner of any one or more of Examples 1 through 7, wherein the processor memory component is configured to store instructions that, when executed by the processor, causes the processor to scan for the RF transmission from the mobile device.

Example 9

The scanner of Example 8, wherein the processor memory component is configured to store instructions that, when executed by the processor, cause the processor to intermittently scan for the RE transmission.

Example 10

The scanner of Example 9, wherein a time period defining the intermittent scan is adjustable.

Example 11

The scanner of any one or more of Examples 1 through 10, wherein the defined environment is determined based on a comparison between a threshold value and a power associated with the RE transmission.

Example 12

The scanner of Example 11, wherein the threshold value is adjustable.

Example 13

The scanner of any one or more of Examples 1 through 12, wherein the processor memory component is configured to store instructions that. when executed by the processor, cause the processor to transmit a mobile device approved status report to a stakeholder.

Example 14

The scanner of any one or more of Examples 1 through 13, wherein the scanner is disposed within a vehicle.

Example 15

The scanner of Example 14, wherein the defined environment comprises a physical extent of the vehicle.

Example 16

The scanner of Example 15, wherein the approval status of the mobile device is approved, approved for a driver location, un-approved, or un-approved for a driver location.

Example 17

The scanner of any one or more of Examples 15 through 16, wherein the defined environment further extends beyond the physical extent of the vehicle.

Example 18

The scanner of Example 17, wherein a mobile device located beyond the physical extent of the vehicle has an approval status of transient.

Example 19

The scanner of any one or more of Examples 1 through 13, wherein the scanner is disposed within a room inside a building.

Example 20

The scanner of Example 19, wherein the defined environment comprises a physical extent of the room.

Example 21

The scanner of Example 19, wherein the defined environment comprises a physical extent of the building.

Example 22

The scanner of Example 19, wherein the approval status of the mobile device is approved or un-approved.

Example 23

The scanner of any one or more of Examples 21 through 22, wherein the defined environment further extends beyond the physical extent of the building.

Example 24

The scanner of Example 23, wherein a mobile device located beyond the physical extent of the building has an approval status of transient.

Example 25

A system for detecting a presence of a non-approved mobile device, the system comprising:
    a server having a server memory component configured to store data in a server database, wherein the server database comprises an identifier for each of a plurality of identified mobile devices, unique identifying data specific to each of the plurality of identified mobile devices, and an approval status for each of the plurality of identified mobile devices; and
    a scanner comprising:
        a database memory component configured to store data in a local database, wherein the local database comprises the identifier for each of the plurality of identified mobile devices, unique identifying data specific to each of the plurality of identified mobile devices, and an approval status for each of the plurality of identified mobile devices;
        one or more antennas, wherein the one or more antennas are configured to receive an RF transmission from a mobile device; and
        a controller comprising a processor in electrical communication with the one or more antennas and in data communication with a processor memory component,
        wherein the processor memory component is configured to store instructions that, when executed by the processor causes the processor to:
            receive the RF transmission from the mobile device within a defined environment;
            obtain, from the RF transmission, unique identifying data specific to the mobile device; and determine an approval status of the mobile device based on the unique identifying data specific to the mobile device,
wherein the processor is in data communication with the local database and the server database.

Example 26

The system of Example 25, wherein the processor memory component is configured to store instructions that, when executed by the processor causes the processor to determine an approval status of the mobile device based on a comparison of the unique identifying data specific to the mobile device and the unique identifying data of an identified mobile device stored in the local database.

Example 27

The system of any one or more of Examples 25 through 26, wherein the processor memory component is configured to store instructions that, when executed by the processor causes the processor to determine an approval status of the mobile device based on a comparison of the unique identifying data specific to the mobile device and the unique identifying data of an identified mobile device stored in the server database.

Example 28

The system of any one or more of Examples 25 through 27, wherein the processor memory component is configured to store instructions that, when executed by the processor, causes the processor to update the local database with the data stored in the server database.

Example 29

The system of any one or more of Examples 25 through 28, wherein the processor memory component is configured to store instructions that, when executed by the processor causes the processor to update the server database with the data stored in the local database.

Example 30

The system of any one or more of Examples 25 through 29, further comprising a known approved mobile device.

Example 31

The system of Example 30, wherein the known approved mobile device comprises:
one or more mobile device antennas, wherein the one or more mobile device antennas are configured to receive an RF transmission from a second mobile device; and
a mobile device controller comprising a mobile device processor in electrical communication with the one or more mobile device antennas and in data communication with a mobile device processor memory component,
wherein the mobile device processor memory component is configured to store instructions that, when executed by the mobile device processor causes the mobile device processor to:
receive the RF transmission from the second mobile device within the defined environment;
obtain, from the RF transmission, unique identifying data specific to the second mobile device; and
transmit the unique identifying data specific to the second mobile device to the scanner.

Example 32

The system of any one or more of Examples 25 through 31, wherein the processor memory component is configured to store instructions that, when executed by the processor, causes the processor to scan for the RF transmission from the mobile device.

Example 33

The system of Example 32, wherein the processor memory component is configured to store instructions that, when executed by the processor, cause the processor to intermittently scan for the RF transmission.

Example 34

The system of Example 33, wherein a time period defining the intermittent scan is adjustable.

Example 35

The system of any one or more of Examples 25 through 34, wherein the defined environment is determined based on a comparison between a threshold value and a power associated with the RF transmission.

Example 36

The system of Example 35, wherein the threshold value is adjustable.

Example 37

The system of any one or more of Examples 25 through 36, wherein the processor memory component is configured to store instructions that, when executed by the processor, cause the processor to transmit a mobile device approved status report to a stakeholder.

Example 38

The system of any one or more of Examples 25 through 37, wherein the scanner is disposed within a vehicle.

Example 39

The system of Example 38, wherein the defined environment comprises a physical extent of the vehicle.

Example 40

The system of Example 39, wherein the approval status of the mobile device is approved, approved for a driver location, un-approved, or un-approved for a driver location.

Example 41

The system of any one or more of Examples 39 through 40, wherein the defined environment further extends beyond the physical extent of the vehicle.

Example 42

The system of Example 41, wherein a mobile device located beyond the physical extent of the vehicle has an approval status of transient.

Example 43

The system of any one or more of Examples 25 through 37, wherein the scanner is disposed within a room inside a building.

Example 44

The system of Example 43, wherein the defined environment comprises a physical extent of the room.

Example 45

The system of Example 43, wherein the defined environment comprises a physical extent of the building.

Example 46

The system of any one or more of Examples 43 through 44, wherein the approval status of the mobile device is approved or un-approved.

Example 47

The system of any one or more of Examples 43 through 44, wherein the defined environment further extends beyond the physical extent of the building.

Example 48

The system of Example 47, wherein a mobile device located beyond the physical extent of the building has an approval status of transient.

What is claimed is:

1. A scanner, separate from a mobile device within a vehicle, for determining an approval status of the mobile device, the scanner comprising:
   a plurality of antennas, wherein each of the plurality of antennas is configured to detect an RF transmission from the mobile device within a corresponding frequency band among a plurality of frequency bands, wherein the RF transmission is directed by the mobile device to other than the scanner; and
   a controller comprising a processor in electrical communication with the plurality of antennas and in data communication with a processor memory component, wherein the processor memory component is configured to store instructions that, when executed by the processor causes the scanner to:
      scan the plurality of frequency bands for the RF transmission when the vehicle is determined to be in motion;
      determine, from the RF transmission, that the mobile device is within the vehicle based on a signal strength of the RF transmission;
      parsing the RF transmission to obtain, from the RF transmission, unique identifying data specific to the mobile device;
      determine an approval status of the mobile device based on the unique identifying data specific to the mobile device, wherein the approval status indicates whether the mobile device is an approved device, the approved device being a mobile device configured to block user access to at least one of a plurality of functions of the mobile device; and
      in response to the mobile device being a non-approved mobile device, cause the approval status to be transmitted to a remote server for incorporation into a report for use by a fleet manager.

2. The scanner of claim 1, further comprising a database memory component configured to store data in a local database, wherein the local database comprises an identifier for each of a plurality of identified mobile devices, unique identifying data specific to each of the plurality of identified mobile devices, and an approval status for each of the plurality of identified mobile devices.

3. The scanner of claim 2, wherein the processor memory component is configured to store instructions that, when executed by the processor causes the processor to determine an approval status of the mobile device based on a comparison of the unique identifying data specific to the mobile device and the unique identifying data of an identified mobile device stored in the local database.

4. The scanner of claim 1, wherein the controller is in wireless data communication with a server having a server memory component configured to store data in a server database, wherein the server database comprises an identifier for each of a plurality of identified mobile devices, unique identifying data specific to each of the plurality of identified mobile devices, and an approval status for each of the plurality of identified mobile devices.

5. The scanner of claim 4, wherein the processor memory component is configured to store instructions that, when executed by the processor causes the processor to determine an approval status of the mobile device based on a comparison of the unique identifying data specific to the mobile device and the unique identifying data of an identified mobile device stored in the server database.

6. The scanner of claim 4, further comprising a database memory component configured to store data in a local database wherein the processor memory component is configured to store instructions that, when executed by the processor, causes the processor to update the local database with data stored in the server database.

7. The scanner of claim 4, further comprising a database memory component configured to store data in a local database wherein the processor memory component is configured to store instructions that, when executed by the processor, causes the processor to update the server database with the data stored in the local database.

8. The scanner of claim 1, wherein the processor memory component is configured to store instructions that, when executed by the processor, cause the processor to intermittently scan for the RF transmission.

9. The scanner of claim 8, wherein a time period defining the intermittent scan is adjustable.

10. The scanner of claim 1, wherein the mobile device is determined to be within the vehicle based on a comparison between a threshold value and a power associated with the RF transmission.

11. The scanner of claim 10, wherein the threshold value is adjustable.

12. The scanner of claim 1, wherein the scanner is disposed within the vehicle.

13. The scanner of claim 1, wherein the RF transmission is a WiFi signal and wherein the unique identifying data is a MAC address of the mobile device.

14. The scanner of claim 1, wherein the RF transmission is a cellular signal and wherein the unique identifying data is an RF signature of the cellular signal.

\* \* \* \* \*